United States Patent [19]

Perrick

[11] 4,422,260
[45] Dec. 27, 1983

[54] BAIT HOLDER

[76] Inventor: James D. Perrick, 9757 Copplestone Cir., Sandy, Utah 84092

[21] Appl. No.: 301,737

[22] Filed: Sep. 14, 1981

[51] Int. Cl.³ .................... A01K 83/02; A01K 83/04; A01K 83/06
[52] U.S. Cl. .................................. 43/44.8; 43/42.47; 43/44.2
[58] Field of Search ...................... 43/44.2, 44.4, 44.6, 43/44.8, 43.13, 42.47

[56] References Cited

U.S. PATENT DOCUMENTS

| 1,791,723 | 2/1931 | Hampton | 43/44.8 |
| 2,148,074 | 2/1939 | Kaspick | 43/44.8 |
| 2,179,641 | 11/1939 | Layfield | 43/42.47 X |
| 2,580,733 | 1/1952 | Cowden | 43/42.47 X |
| 2,583,680 | 1/1952 | Brennan | 43/44.6 X |
| 2,900,754 | 8/1959 | Orlik | 43/44.2 |

FOREIGN PATENT DOCUMENTS 260496 3/1949 Switzerland ..................... 43/44.2

Primary Examiner—Nicholas P. Godici
Assistant Examiner—Charles L. Willis
Attorney, Agent, or Firm—B. Deon Criddle

[57] ABSTRACT

A bait holder comprising a spring frame including a main support wire and a spring wire. The spring wire is integral with the main support wire and locks to the main support wire during threading of a minnow, small fish, or other artificial bait thereon, and then is released from the main support wire to spring open inside the bait to securely hold the bait in place on the support frame. A control member, secured to the frame by the resiliency of the main support wire and the spring wire serves to additionally hold the bait on the frame and also serves as a control rudder to provide a desired movement to the frame during use of the frame.

6 Claims, 7 Drawing Figures

BAIT HOLDER

BRIEF DESCRIPTION OF THE INVENTION

1. Field of the Invention

This invention relates to fishing, and is particularly concerned with devices that are used to hold minnows, small fish, and other bait items to be used as a fishing lure.

2. Prior Art

It has long been common to provide a support frame on which minnows, small fish, and other bait items are threaded so that they may be used by a fisherman as a fishing lure.

U.S. Pat. Nos. 580,915 1,791,723, and 2,148,074, each show a wire frame that is used to support a minnow, small fish, or other bait item, in such a way that the frame and bait item thereon can be used by a fisherman as a fishing lure. In addition, Canadian Pat. No. 800,765, issued Dec. 10, 1968, also discloses a use of a wire frame, on which a bait item such as a minnow, or worm, is threaded such that the frame and bait, together, can be used as a fishing lure. In U.S. Pat. No. 580,915, a straight arm of a support frame is inserted through the mouth of a minnow, small fish or that like, adapted to be mounted on the frame and is projected through the opposite end of the bait. Thereafter, a hook at the end of a shorter arm is engaged with the portion of the straight arm projecting through the bait. The bait is thus clamped against rotational movement on the straight arm by the short arm. A loop is attached to the leading end of the frame, and wires, with hooks thereon, are attached to the loop to extend along side and behind the bait. A similar arrangement is shown in U.S. Pat. No. 1,791,723. In this patented structure however, the fish hook is fixed to and forms an extention of the arm that clamps to the straight arm inserted through the bait. U.S. Pat. No. 2,148,074 also shows a support frame for bait, having a long arm and a short arm, but in this patented device, the long arm has a hook to engage the short arm. Both the long arm and the short arm are provided with hooks on the free end thereof and to use the device, the arms are separated and a bait item, such as a minnow, is threaded mouth first over the hook of the short arm and on to the short arm until it is held by barbs projecting from the short arm. Thereafter, the long arm is moved towards the short arm until the hook of the long arm engages the short arm, thereby clamping the bait item in position.

U.S. Pat. No. 2,196,376, teaches the use of a bait holder wherein a sharpened portion is adapted to be inserted from a location in the body of a bait item, such as a minnow, through the mouth of the bait to be engaged by a catch on a fish line. A treble hook is fixed to the sharpened portion such that one of the hooks will project into the body of the bait item and with the other hooks extending outwardly therefrom. A water resistant member is fixed to the sharpened portion and extends downwardly from a bait item fixed thereto, such that water action will react against the water resistance plate to impart a back and forth action to the bait carried by the holder. The Canadian Pat. No. 800,765, teaches the use of a support frame for bait and the like, wherein a straight wire or rod has a threaded end arranged such that after bait is threaded onto the wire rod, an end piece can be threaded on to hold the bait in place and to provide attachment for hook means. Weights, spinners, and spoons, are provided to impart a desired movement of the bait as the lure is used in fishing.

OBJECTS OF THE INVENTION

Principal objects of the present invention are to provide a support frame that will usually accommodate the positioning of bait thereon and that will then hold the bait in a fixed, realistic appearing position as the frame and bait are used as a fishing lure. Other objects are to provide such a support frame that is easily used, with the bait item being easily threaded thereon, securely held in place, and wherein the support frame is totally hidden when threaded into the bait item.

PRINCIPAL FEATURES OF THE INVENTION

Principal features of the invention include a support frame made up of a long wire leg and a short wire leg integral with the long wire leg and said short wire leg having a small hook bent in the free end thereof. The long leg and the short leg are arranged such that when the short leg is hooked to the long leg, the legs are in very close approximate relationship. When the hook of the short leg is released from the long leg, the legs spread apart. The free end of the long leg has an islet formed thereon to which a hook or a gang bar for hooks is attached. A stop device is adapted to fit over the legs and to prevent movement of a bait item threaded onto the legs when the short leg is in its locked position after the short leg has been released inside the bait item to spread and to additionally hold the bait in place. The stop device in addition to cooperating with the frame to prevent the bait from sliding thereoff, also provides a water resistance element that will provide desired motion to the frame and the bait thereon during fishing operations.

Additional objects and features of the invention will become apparent from the following detailed description and claims, taken together with the accompanying drawing, showing a preferred form of the invention.

THE DRAWINGS

In the drawings:

FIG. 1 is a side elevation view of a bait holder of the invention, with a bait item in the form of a minnow or small fish, threaded thereon and shown in phantom;

FIG. 2, a similar view to that of FIG. 1, but showing the short arm of the frame unhooked from the long arm;

FIG. 3, a side elevation view of another embodiment of the bait holder of the invention;

FIG. 4, a similar view of still another embodiment of bait holder;

FIG. 5, a perspective view of another embodiment of stop device useable with the bait holder of the invention;

FIG. 6, a rear view of the stop device of FIG. 5; and

FIG. 7, a perspective of still another embodiment of the bait holder of the invention.

DETAILED DESCRIPTION

Figure 1:
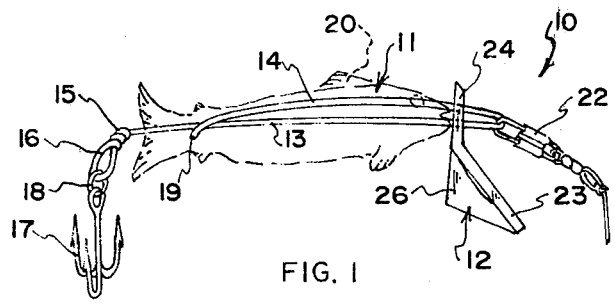
Figure 2:
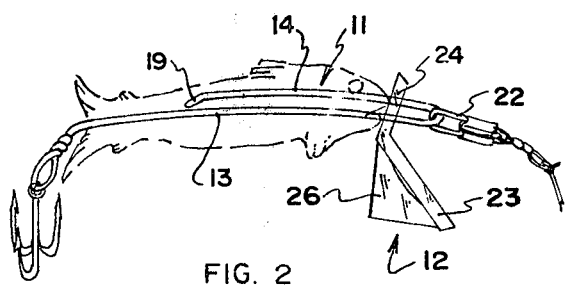

Referring now to the drawing:

In the illustrated preferred embodiment of FIGS. 1 and 2, the bait holder of the invention shown generally at 10, includes a frame 11 and a control member 12. The frame 11 is made up of a resilient wire bent to provide a long leg 13 and a short leg 14. The free end of the long leg 13 is bent back and wrapped around itself at 15 to form a loop 16 to which a treble fishhook 17 is attached by a wire loop 18.

The free end of short leg 14 is bent for a short length to form a hook 19 such that the hook 19 will engage beneath the long leg 13 to hold the short leg closely against the long leg.

In using the bait handler 10, with the short leg 14 hooked to the long leg 13, a bait item, such as the minnow 20 is threaded tail end first onto the frame. Thereafter, the control member 12 is slipped over the joined ends of the legs of the frame and a snap-swivel 22 is attached at the junction of the legs. A slight pressure applied to the side of the bait then releases the short leg from the long leg and allows the short leg to spring apart from the long leg inside the bait as shown in FIG. 2. The legs then firmly hold the bait in place and properly oriented to provide a realistic lure for use by the fisherman.

The control member 12 includes a large water reaction portion 23 and a tab 24. An elongate slot 25 is provided through the tab 24 and the slot is dimensioned to slide over the legs 13 and 14 and to be frictionally held on the legs when they are separated. A rudder 26 extends rearwardly from the water reaction portion 23. The control member serves to hold the bait against its sliding forward along the frame 11. In addition, the control member 12 stabilizes the motion of the bait holder and bait as they are trolled or rested to give a more realistic action in simulation of lure movement of the bait. While various configurations of the water reaction surface 12a of the water reaction portion 23 can be utilized to achieve different actions, it has been found that a concave surface will give a slow, smooth movement.

Figure 3:
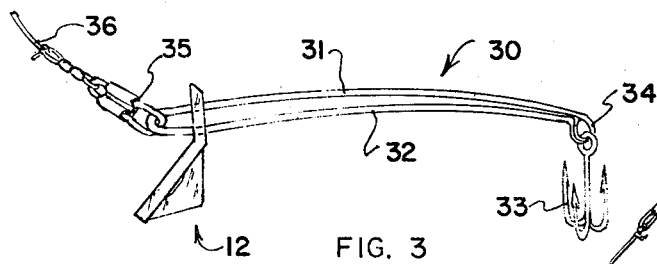

In the embodiment of the invention shown in FIG. 3, the bait holder, shown generally at 30 includes a frame including a pair of resilient wire legs 31 and 32 interconnected at the opposite ends and normally bowed apart as shown in solid lines, FIG. 3. In using the bait holder 30, the legs 31 and 32 are squeezed together as shown in dotted lines, as a bait such as the minnow of FIG. 1 or a small fish is threaded rear end first onto the legs 31 and 32 the legs are released as the bait is fully positioned, a control member, such as the control member 12, previously described is placed thereon to hold the bait on the frame 30. A treble hook 33 is attached to a loop 34 formed at one end of the legs 31 and 32 and a snap swivel 35 is attached to the other end for attachment of a fishing line 36.

Figure 4:
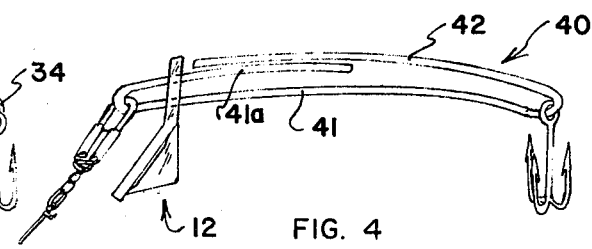
Figure 5:
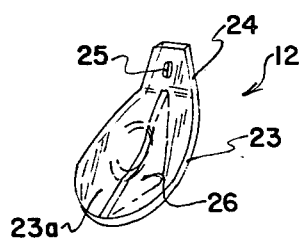
Figure 6:
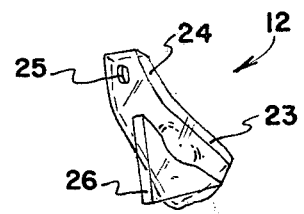

In the embodiment of FIG. 4, a frame 40 includes a generally U-shaped long leg 41 and a short leg 42. As shown, the bent leg 41a portion of the long leg is hooked beneath the short leg 41. After a bait item has been threaded thereon and a control member such as is shown at 12 has been placed thereon, a side pressure is applied to release the bent leg portion 41a and to allow it to expand inside the bait item in the manner previously described.

Figure 7:
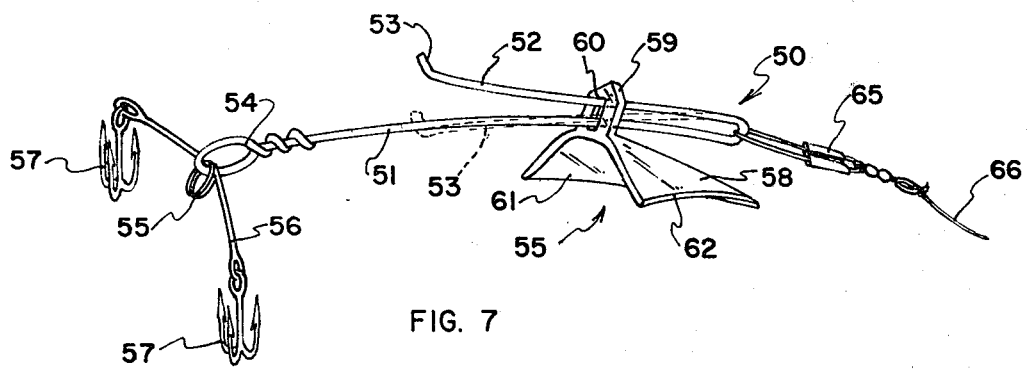

In the preferred embodiment of the invention shown in FIG. 7, the frame 50 includes a long leg 51 and a short leg 52 with a hook 53 on the free end thereof. An eye 54 at the free end of the long leg 51 receives the center loop 55 of a gang bar 56 of a pair of treble hooks 57.

The control member 55 shown in FIG. 7 includes a water reaction portion 58 shaped as a curved hydrofoil, and a tab 59. An elongate slot 60 is provided through the tab 59 to permit the control member to slide over the legs 52 and 53 and to frictionally engage the legs when leg 52 is released from leg 51. The hydrofoil shaped water reaction portion 58 includes a leading surface curved downwardly to outer edges 61 and 62 that terminate in a forward center point.

The bait holder of FIG. 7 is used in the same manner as that of FIG. 1. The short leg 52 is hooked by hook 53 beneath long leg 51 and a bait item such as a minnow or small fish is threaded thereon. The minnow or small fish is then held in place by the control member and the short leg is released to further hold the bait in place. The usual snap swivel 65 is then attached and a fishing line 66 is connected to the swivel. As the lure made up of the bait holder and bait is trolled or reeled in a movement of the lure similar to actual minnow or small fish movement is achieved.

Although preferred forms of the embodiments have been herein disclosed, it is to be understood that the present disclosure is by way of example and that variations are possible without departing from the subject matter coming within the scope of the following claims, which subject matter is regarded as the invention.

I claim:

1. A bait holder comprising
   a support frame having a pair of joined legs, at least one of said legs being movable into close side-by-side relationship with the other of said legs and being resiliently movable away from said side-by-side relationship;
   a control member having a water reaction portion and a tab projecting from said water reaction portion, said tab having an elongate slot therethrough whereby said tab will slide over the legs at the joined ends thereof and will be held on said legs by movement of one leg away from the other leg; and
   a fish hook carried by at least one leg at the end of said legs opposite the joined ends thereof.

2. A bait holder as in claim 1 wherein
   the pair of legs comprise a long leg and a short leg, the short leg being bent at the free end thereof to provide a hook to engage beneath the long leg; and
   means on the free end of the long leg for securing at least one fish hook thereto.

3. A bait holder as in claim 2 wherein
   the water reaction portion comprises a dished surface angled away from the legs and forwardly in the direction of the junction of the legs and a vertical rudder extending rearwardly from the dished surface.

4. A bait holder as in claim 2, wherein
   the water reaction portion comprises a hydrofoil surface curved away from the legs to opposite edges and said edges extending in the direction of the junction of the legs to a point.

5. A bait holder as in claim 1, wherein
   the water reaction portion comprises a dished surface angled away from the legs and forwardly in the direction of the junction of the legs and a vertical rudder extending rearwardly from the dished surface.

6. A bait holder as in claim 1, wherein
   the water reaction portion comprises a hydrofoil surface curved away from the legs to opposite edges and said edges extending in the direction of the junction of the legs to a point.

* * * * *